United States Patent [19]

McGinn et al.

[11] 4,351,001
[45] Sep. 21, 1982

[54] HORIZONTAL PHASE LOCK LOOP FOR TELEVISION

[75] Inventors: Michael McGinn, Tempe; Gerald K. Lunn, Scottsdale, both of Ariz.

[73] Assignee: Motorola, Inc., Schaumburg, Ill.

[21] Appl. No.: 220,608

[22] Filed: Dec. 29, 1980

[51] Int. Cl.³ .................................. H04N 5/04
[52] U.S. Cl. .................................. 358/158; 375/120
[58] Field of Search ............. 358/148, 150, 151, 158, 358/159; 375/106, 108, 111, 113, 118–120; 331/20

[56] References Cited

U.S. PATENT DOCUMENTS

| | | | |
|---|---|---|---|
| 3,821,470 | 6/1974 | Merrell | 358/159 |
| 3,891,800 | 6/1975 | Janssen | 358/159 |
| 4,063,133 | 12/1977 | Nero | 358/159 |
| 4,214,260 | 7/1980 | van Straaten | 358/148 |
| 4,251,833 | 2/1981 | Fernsler | 358/148 |

*Primary Examiner*—Michael A. Masinick
*Attorney, Agent, or Firm*—Vincent B. Ingrassia

[57] ABSTRACT

A horizontal phase lock loop for use in a television receiver comprises first and second loops and a horizontal oscillator which generates a ramp signal at a frequency of twice the line frequency. The first loop locks the oscillator signal to the horizontal synchronization pulses. The oscillator output is sliced and then divided by two to achieve a fifty percent duty cycle drive waveform to the phase detector in the first loop and to a phase detector in the second loop. The second loop includes a variable slicer which operates on the oscillator ramp signal so as to lock the flyback signal generated by the horizontal output stage to the second phase detector's switching waveform. Both loops include a divide-by-two circuit which assures fifty percent duty cycle drive waveforms.

13 Claims, 7 Drawing Figures

HORIZONTAL PHASE LOCK LOOP FOR TELEVISION

CROSS REFERENCE TO RELATED APPLICATIONS

1. U.S. application Ser. No. 220,606 entitled "Horizontal Oscillator"
2. U.S. application Ser. No. 220,604 entitled "Horizontal Phase Detector Gain Control"
3. U.S. application Ser. No. 220,328 entitled "Linear Full Wave Rectifier and Method for Providing Full Wave Rectified Signals"
4. U.S. application Ser. No. 220,607 entitled "Large Scale, Single Chip Integrated Circuit Television Receiver Subsystem"
5. U.S. application Ser. No. 220,609 entitled "Variable Capacitance Circuit"
6. U.S. application Ser. No. 220,605 entitled "Crossover Circuit for Use in Automatic Gain Control Systems"
7. U.S. application Ser. No. 220,329 entitled "Linear Full Wave Rectifier Circuit"
8. U.S. application Ser. No. 220,611 entitled "Sync Separator"
9. U.S. application Ser. No. 220,610 entitled "Vertical Sync Counter Having Multi Modes of Operation For Different TV Systems"
10. U.S. application Ser. No. 220,617 entitled "Integrator Circuit For Separating Vertical Sync Pulses"

BACKGROUND OF THE INVENTION

1. Field of the Invention

This invention relates generally to television receiver systems and, more particularly, to an improved horizontal phase lock loop which employs an oscillator which oscillates at twice line frequency, provides an accurate fifty percent duty cycle horizontal output drive waveform and provides an accurate fifty percent duty cycle phase detector switching waveform to assure symmetrical pull-in performance.

2. Description of the Prior Art

In most modern television receivers, a phase lock loop is employed to lock the horizontal oscillator in the horizontal sweep section of the receiver to the incoming separated horizontal synchronization pulses to establish the phase relationship between the incoming synchronization pulses and the horizontal flyback pulse thus fixing the television picture on the raster. In the prior art single loop system, the horizontal oscillator operates at line frequency (15.75 KHz in the United States) and its output is a ramp signal. This ramp signal is then shaped to form a square wave drive signal to the horizontal output stage which in turn produces flyback pulses approximately 10 microseconds wide and approximately 63 microseconds apart. The flyback pulses are then processed by external wave shaping circuitry to produce a ramp signal which is applied to one input of a horizontal phase detector. The phase detector has a second input coupled to a bias voltage. The incoming horizontal synchronization pulse gates the phase detector which generates a d.c. output for controlling the horizontal frequency.

This system suffers from several disadvantages. First, many external components are required to shape the flyback pulse stream into a ramp for the phase detector. Second, the pull-in symmetry of the loop depends on the shaped ramp and the flyback signal which may vary with signal conditions and loading. Third, the loop's response time or bandwidth is a compromise between a requirement for good low signal operation (low bandwidth and slow response time) and variations in loop delay in the horizontal output stage which requires a fast loop response to avoid horizontal displacement of portions of the picture on the raster. Finally, this system does not provide a clock signal at twice line frequency for a vertical countdown section. If the vertical deflection signal is derived from the horizontal oscillator by countdown, then the twice line frequency clock is required at the counter input to provide for proper vertical interlacing.

To reduce the effects of the first three disadvantages described above, two loop systems have been employed; e.g. the TBA920/TDA2590 2-loop system by Philips. This system suffers, however, from the disadvantage that the duty cycle of the horizontal output stage drive signal varies as the second loop corrects for changes in loop delays. Furthermore, this system does not employ a 31.5 KHz oscillator necessary for vertical countdown; i.e. twice U.S. line frequency.

SUMMARY OF THE INVENTION

It is an object of the present invention to provide an improved horizontal phase lock loop for a television receiver.

It is a further object of the invention to provide a phase lock loop for a television receiver which provides a clock signal at twice the line frequency to a vertical countdown counter to achieve proper vertical interlacing.

It is a still further object of the invention to provide a horizontal phase lock loop for a television receiver which provides a horizontal output drive signal and a phase detector switching signal each of which have an accurate fifty percent duty cycle.

According to a first aspect of the invention there is provided a horizontal phase lock loop for use in a television receiver of the type which receives horizontal synchronization pulses at the picture line frequency and which includes a horizontal output stage for generating flyback pulses, comprising: an oscillator for generating a signal at a frequency substantially equal to twice said line frequency; a first loop which includes said oscillator for locking said oscillator to said horizontal synchronization pulses and for generating a switching waveform; and a second loop coupled to said oscillator and driven by said switching waveform for locking said flyback pulses to said switching waveform.

According to a second aspect of the invention there is provided a method for locking the horizontal oscillator of a television receiver to the line frequency horizontal synchronization pulses received by said television receiver, comprising: generating with said horizontal oscillator a first signal having a frequency susbstantially equal to twice said line frequency; dividing said first signal by two to produce a fifty percent duty cycle switching waveform; comparing said switching waveform with said synchronization pulses; and generating a control signal indicative of the phase difference between said switching waveform and said synchronization pulses to control said oscillator.

The above and other objects, features and advantages of the invention will be better understood from the following detailed description taken in conjunction with the accompanying drawings, in which:

DESCRIPTION OF THE PREFERRED EMBODIMENT

Before embarking on a detailed discussion of the invention, it may be helpful to briefly review basic television principles. A complete TV picture appears on the TV screen thirty times per second. Between each picture, there is an interval during which the screen is dark. Each TV frame, however, is not projected as a complete picture but is created in sections by varying the brightness of a moving spot of light. That is, the picture tube contains an electron gun which generates an electron beam which moves very rapidly across a phosphor coated screen and, by changing its strength, different amounts of light are produced in different places. More exactly, the electron beam is focused into a fine point that moves from the upper left-hand corner in a straight horizontal line to the right side of the screen. After each movement from left to right, the beam intensity is reduced so that no light is produced during the return motion from right to left. After each line is painted, the beam is moved down a little on the tube face. While the motion of the electron beam is called "scanning", the electronic actions involved are generally referred to a "sweeping" and we speak of a horizontal sweep frequency of approximately 15,750 cycles per second.

It should be obvious that there must be some synchronization between the image seen by a remote television camera and that which is ultimately shown on the TV screen. If, for example, the receiver scans a picture in more or less than one-thirtieth of a second, the picture will appear to roll vertically. Thus, great care is taken to synchronize accurately the scanning of each line and frame. To achieve this, synchronizing signals are transmitted to the receiver with the sound and video information. In addition to providing signals which control the starting of each line, the edges of the picture must be blanked out to avoid any appearance of ragged edges, and the electron beam must turned off during the time in which it returns to its starting place. This return time is often referred to as the retrace or flyback period and is approximately 9 microseconds long for each line (the horizontal flyback), but is considerably longer for the period when the beam returns from the bottom to the top of the screen (the vertical flyback period).

Figure 1:
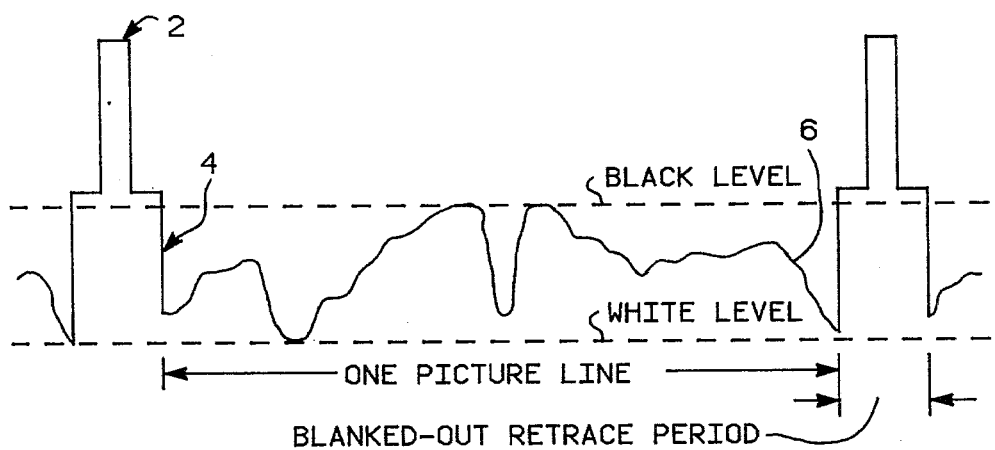
FIGS. 1 and 2 illustrate the composite video signal received by a television receiver.

FIG. 1 illustrates a black and white video signal including the horizontal synchronization pulses 2 and the horizontal blanking or flyback pulse 4. Interposed between successive flyback pulses is the actual black and white video signal 6 corresponding to one picture line. As can be seen, the horizontal flyback pulse 4 extends into the black region so that the edges of the picture are completely black avoiding the appearance of ragged edges.

Figure 2:
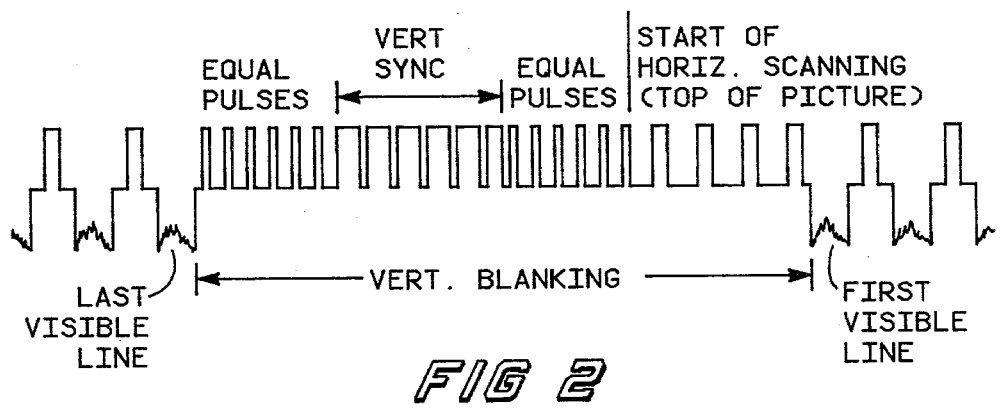

Referring to FIG. 2, the start of each field of vertical scanning is dictated by a vertical synchronization pulse which lasts much longer than the horizontal synchronization pulses. To avoid losing horizontal synchronization during the vertical flyback or blanking period, the horizontal synchronization pulses are superimposed on the vertical blanking pulse. The first six pulses are very narrow and are referred to as equalizing pulses. Next, there are periods of six wide pulses which comprise the actual vertical synchronization pulse serrated by the horizontal synchronization period. This is followed by an additional six equalizing pulses and then four regular horizontal synchronizing pulses that start the top of the picture. Note that the vertical blanking period extends through this time and darkens the screen while the beam moves from bottom to top and covers the first four lines of the picture.

Figure 3:
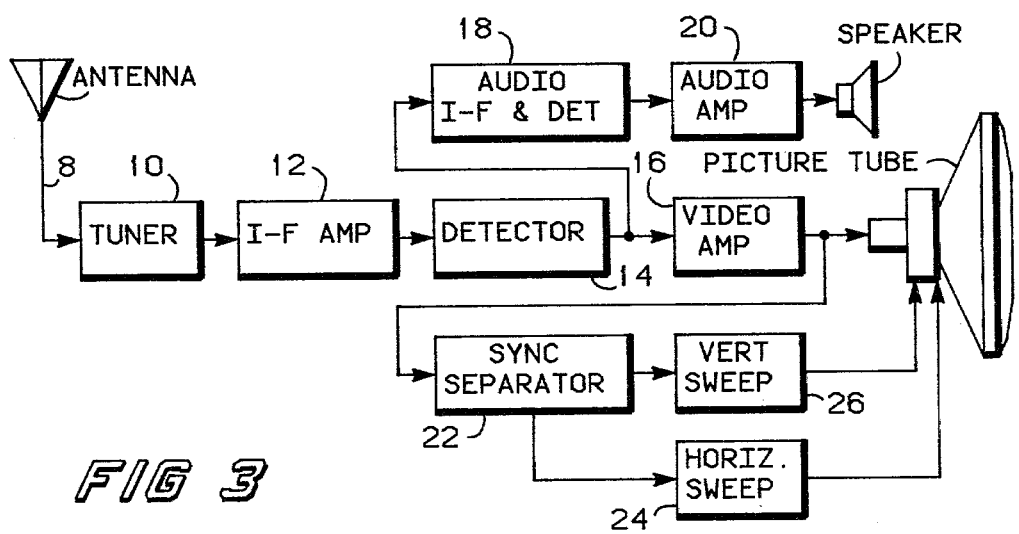
FIG. 3 is a block diagram of a basic prior art television receiver.

FIG. 3 is a block diagram of a basic black and white TV receiver. From the antenna, a transmission line 8 brings all signals received by the antenna to tuner 10 whose function it is to select the desired band of frequencies and reject all others. The tuner passes only the desired intermediate frequency to the IF amplifiers 12.

Television IF amplifiers 12 include a plurality of IF stages which amplify the IF signals. To prevent overloading and to minimize picture changes during fading, automatic gain control is used to control the amplification of the IF signal.

The output of IF amplifiers 12 is applied to a detector 14 which removes the amplitude modulated video signal and applies it to video amplifier 16. The sound signal is removed, amplified, clipped, and limited in audio section 18. The output of audio detector 18 is applied to audio amplifier 20 which is similar to audio amplifiers found in radio receivers. The output of the audio amplifier is applied to the speaker.

Video amplifier 16 requires more bandwidth than audio amplifier 20. This is accomplished using special peaking circuits for the high and low frequency response. The output of video amplifier 16 is applied to the picture tube and to a sync separator 22 which is unique to television receivers. As described earlier, the horizontal and vertical synchronization pulses appear on top of their respective blanking signals which are sandwiched in between lines of picture signal. The sync separator clips the synchronization pulses off the composite video signal after the signal has been amplified in video amplifier 16. Two separator filters may be employed to separate the vertical from the horizontal synchronization pulses. For example, a high pass filter would permit only the horizontal synchronization pulses to reach horizontal sweep section 24 whle the vertical pulses could be passed through a low pass filter to the vertical sweep section 26.

The vertical sweep section generates the actual signals which pass through the deflection yoke of the picture tube to move the electron beam up and down. Similarly, the horizontal sweep section is responsible for moving the electron beam across the tube. In order to obtain the large current of short duration required in the horizontal deflection coils, a transformer is generally used. Furthermore, a flyback transformer is generally considered part of the horizontal sweep section. This transformer generates a high voltage during the time in which the electron beam returns from right to left.

Figure 4:
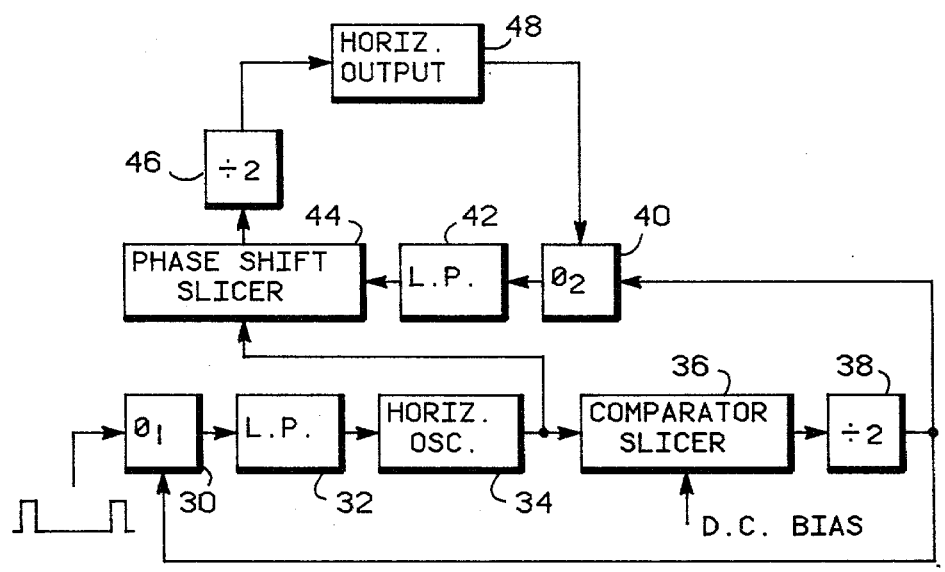
FIG. 4 is a block diagram of the inventive horizontal phase lock loop.
Figure 5A:
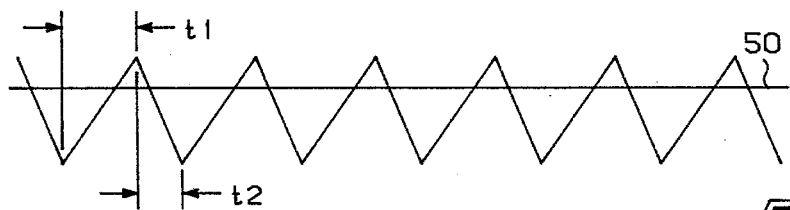
FIGS. 5A, 5B and 5C illustrate waveforms appearing at certain points in FIG. 1.
Figure 5B:

Co-pending U.S. patent application Ser. No. 220,607 entitled "Large Scale, Single Chip Integrated Circuit Television Receiver Subsystem" and filed of even date herewith describes a VLSI single chip television receiver into which the inventive horizontal phase lock loop may be incorporated. FIG. 4 is a block diagram of the inventive two loop horizontal phase lock loop. The first loop consists of a first phase detector 30, a first low pass filter 32, a horizontal oscillator 34, a comparator slicer 36 and a divide-by-two circuit 38. Phase detector 30 has a first input coupled to the horizontal synchronization pulse stream and a second input coupled to the output of the divide-by-two circuit 38. Horizontal oscillator 34 generates asymmetrical ramp signal of the type shown in FIG. 5A at a frequency of 31.5 KHz (twice the line frequency in the U.S.). The ramp signal has a ramp up time of t1=20 microseconds and a ramp down time of t2=12 microseconds. The output of the oscillator is applied to a first input of comparator slicer 36, and a bias voltage is applied to its second input. The DC bias voltage is shown as line 50 in FIG. 5A. The output of comparator slicer 36 is shown in FIG. 5B.

Figure 5C:
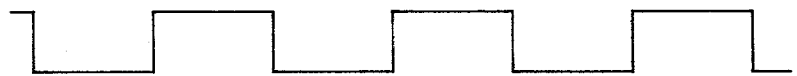

It is important to note that since the horizontal oscillator is implemented on chip, the ramp signal is less likely to be subject to unwanted variations. However, even if such unwanted variations should occur, the divide-by-two circuit is implemented so as to trigger off the trailing edge of the waveform appearing at the output of comparator slicer 36. This assures a fifty percent duty cycle signal appearing at the output of divide-by-two circuit 38 as is shown in FIG. 5C. The output of divide-by-two circuit 38 is fed back to a second input of phase detector 30 and is used to gate the phase detector. The output of phase detector 30 is filtered in low pass filter 32 the output of which represents a DC control voltage for altering the frequency of horizontal oscillator 34. Thus, the output of divide-by-two circuit 38 is used to gate phase detector 30 thus locking the horizontal oscillator to the horizontal synchronization pulses. Circuits which are suitable for use as phase detector 30 are well known and a further discussion of them is not deemed necessary. One suitable phase detector circuit is shown in co-pending U.S. patent application Ser. No. 220,604 entitled "Horizontal Phase Detector Gain Control" filed of even data herewith. Further, a suitable oscillator for use as horizontal oscillator 34 is shown and described in co-pending U.S. patent application Ser. No. 220,606 entitled "Horizontal Oscillator" and filed of even date herewith.

The second loop comprises a second phase detector 40, a second low pass filter 42, phase shift slicer 44, a second divide-by-two circuit 46 and horizontal output circuit 48. The output of divide-by-two circuit 38 is applied to the second phase detector 40 and serves as a switching signal which is gated directly by the flyback pulse coming from horizontal output 48 and applied to a second input of phase detector 40. The output of phase detector 40 is filtered in low pass filter 42 which in turn generates an output which is applied to phase shift slicer 44 for controlling its slicing level. The output of horizontal oscillator 34 is applied to a second input of phase shift slicer 44. The output of phase shift slicer 44, as shown in FIG. 5B, is applied to a divide-by-two circuit 46 which in turn generates a signal similar to that shown in FIG. 5C. The divide-by-two circuit 46 triggers on a single edge of the slicer output so as to assure a fifty percent duty cycle signal. The output of divide-by-two circuit 46 is applied as a drive signal to the horizontal output circuit 48 which in turn generates the flyback drive signal to the horizontal output circuit 48 which in turn generates the flyback pulses which are fed back to the second phase detector 40. Thus, by controlling the slicing level in phase shift slicer 44, the phasing of the horizontal drive output can be controlled such that the flyback waveform is centered on the switching waveform applied from divide-by-two circuit 38 to phase detector 40.

The above described approach overcomes loop ambiguities and provides accurate fifty percent duty cycle switching waveforms to both phase detectors and to the horizontal output resulting in symmetrical pull-in. The phase relationship between the first and second loops may be adjusted by designing in a predetermined offset in the second loop phase detector. Further, since horizontal oscillator 34 is operating at twice the line frequency it is suitable for use with a vertical countdown system.

While the invention has been described with reference to a specific embodiment thereof, changes in form and details may be made by one skilled in the art without departing from the scope of the invention as defined by the appended claims.

I claim:

1. A horizontal phase lock loop for use in a television receiver of the type which receives horizontal synchronization pulses at the picture line frequency and which includes a horizontal output stage for generating flyback pulses, comprising:
   an oscillator for generating a signal at a frequency substantially equal to twice said line frequency;
   a first loop which includes said oscillator for locking said oscillator to said horizontal synchronization pulses and for generating a switching waveform, said first loop also including:
      a first phase detector having a first input coupled to receive said synchronization pulses, a second input coupled to said switching waveform and an output coupled to said oscillator, said first phase detector generating a first control signal for altering the frequency of said oscillator; and
      a first divide by two circuit having an input coupled to the output of said oscillator for producing said switching waveform; and
   a second loop coupled to said oscillator and driven by said switching waveform for locking said flyback pulses to said switching waveform, said second loop also including:
      a second phase detector having a first input coupled to said switching waveform and a second input coupled to receive said flyback pulses for generating a second control signal;
      first means having a first input coupled to said signal and second input coupled to said second phase detector for slicing said signal in accordance with said second control signal and producing a second signal having a frequency substantially equal to said signal; and
      a second divide by two circuit having an input coupled to the output of said first means and an output coupled to said horizontal output stage for producing a fifty percent duty cycle drive wave form having a frequency substantially equal to said line frequency.

2. A horizontal phase lock loop according to claim 1 wherein said signal is a ramp signal and wherein said synchronization pulses are locked to a point on said ramp signal.

3. A horizontal oscillator according to claim 1 wherein said switching waveform has a fifty percent duty cycle and a frequency substantially equal to said line frequency.

4. A horizontal oscillator according to claim 3 wherein the output of said oscillator is a ramp signal and wherein said first loop further comprises a comparator circuit coupled between said oscillator and said first divide-by-two circuit for generating a first signal having a frequency substantially equal to that of said oscillator.

5. A horizontal oscillator according to claim 4 further including a first low pass filter coupled between said first phase detector and said oscillator.

6. A horizontal oscillator according to claim 4 further including a second low pass filter coupled between said second phase detector and said first means.

7. A method for locking the horizontal oscillator of the television receiver to the line frequency horizontal synchronization pulses received by said television receiver, comprising:
    generating with said horizontal oscillator a first signal a having frequency substantially equal to twice that line frequency;
    dividing said first signal by two to produce a fifty percent duty cycle switching waveform;
    comparing said switching waveform with said synchronization pulses;
    generating a control signal indicative of the phase difference between said switching waveform and said synchronization pulses to control said oscillator;
    slicing said first signal at a bias level;
    dividing the sliced first signal by two to generate a horizontal output stage drive signal;
    generating flyback pulses from said drive signal;
    comparing said flyback pulses with said switching waveform; and
    generating a second control signal indicative of phase difference between said flyback pulses and said switching waveform to control said bias level.

8. A method according to claim 7 further including:
    slicing said first signal;
    dividing the sliced first signal by two to generate a horizontal output stage drive signal;
    generating flyback pulses from said drive signal;
    comparing said flyback pulses with said switching waveform; and
    generating a second control signal indicative of the phase difference between said flyback pulses and said switching waveform to control said bias level.

9. A horizontal phase lock loop for use in a television receiver of the type which receives horizontal synchronization pulses at the picture line frequency and which includes a horizontal output stage for generating flyback pulses, comprising:
    oscillator means for generating a signal at twice the line frequency;
    first means coupled to said oscillator means for generating a fifty percent duty cycle switching waveform having a frequency substantially equal to said line frequency;
    first comparing means for comparing said switching waveform with said synchronization pulses and generating a first error signal proportional to the phase difference between said switching waveform and said synchronization pulses for altering the frequency of said oscillator means;
    second comparing means for comparing said switching waveform with said flyback pulses and generating a second error signal proportional to their phase difference; and
    second means coupled to said second comparing means and to said oscillator means for applying a fifty percent duty cycle line frequency drive waveform to said horizontal output stage the phase of which is altered by said second error signal.

10. A horizontal phase lock loop according to claim 9 wherein said first means comprises:
    a first comparator having a first input coupled to the output of said oscillator means and a second input coupled to a bias voltage; and
    a divide-by-two circuit coupled between said first comparator and said first comparing means for generating said switching waveform.

11. A horizontal phase lock loop according to claim 10 wherein said first comparing means includes a first phase detector.

12. A horizontal phase lock loop according to claim 9 wherein said second comparing means includes a second phase detector.

13. A horizontal phase lock loop according to claim 12 wherein said second means comprises:
    third means for slicing said signal in accordance with said second error signal to produce a square wave; and
    a second divide-by-two circuit having an input coupled to the output of said third means for producing said drive waveform.

* * * * *

UNITED STATES PATENT AND TRADEMARK OFFICE
CERTIFICATE OF CORRECTION

PATENT NO. : 4,351,001
DATED : September 21, 1982
INVENTOR(S) : Michael McGinn et al.

It is certified that error appears in the above-identified patent and that said Letters Patent are hereby corrected as shown below:

Column 7, claim 7, line 6, change "a having" to

--having a--.

Signed and Sealed this

Ninth Day of August 1983

[SEAL]

Attest:

GERALD J. MOSSINGHOFF

Attesting Officer   Commissioner of Patents and Trademarks